United States Patent
Spindler et al.

(10) Patent No.: US 8,880,343 B2
(45) Date of Patent: Nov. 4, 2014

(54) SYSTEM FOR DIGITAL MAP LABELING

(75) Inventors: Carsten-Christian Spindler, Karlsruhe (DE); Vladimir Ivanov, München (DE); Martin Fischer, München (DE); Simon Schütz, Stuttgart (DE); Alexey Pryakhin, München (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 74 days.

(21) Appl. No.: 13/426,228

(22) Filed: Mar. 21, 2012

(65) Prior Publication Data
US 2012/0245848 A1    Sep. 27, 2012

(30) Foreign Application Priority Data
Mar. 22, 2011 (EP) .................................... 11002358

(51) Int. Cl.
*G01C 21/26* (2006.01)
*G01C 21/32* (2006.01)
*G01C 21/36* (2006.01)
*G09B 29/00* (2006.01)

(52) U.S. Cl.
CPC .................................. *G01C 21/3673* (2013.01)
USPC ...................................................... 701/532

(58) Field of Classification Search
CPC ....................................................... G01C 21/26
USPC ........................................................ 701/532
See application file for complete search history.

(56) References Cited

U.S. PATENT DOCUMENTS

| | | | |
|---|---|---|---|
| 5,684,940 A | 11/1997 | Freeman et al. | |
| 6,360,168 B1 | 3/2002 | Shimabara | 701/211 |
| 6,565,610 B1 * | 5/2003 | Wang et al. | 715/210 |
| 6,710,774 B1 | 3/2004 | Kawasaki et al. | |
| 6,718,304 B1 | 4/2004 | Tachimori et al. | |
| 7,084,882 B1 | 8/2006 | Dorum et al. | |
| 7,557,736 B1 * | 7/2009 | Daily et al. | 340/995.1 |
| 7,665,040 B2 | 2/2010 | Nakamura | |
| 7,765,055 B2 * | 7/2010 | Cera et al. | 701/117 |
| 7,933,395 B1 * | 4/2011 | Bailly et al. | 379/201.04 |
| 8,260,545 B1 | 9/2012 | Aspen et al. | |

(Continued)

FOREIGN PATENT DOCUMENTS

DE    10 2006 059 922 A1    6/2008
DE       102008036748 A1   10/2009

(Continued)

OTHER PUBLICATIONS

Office Action, dated Mar. 7, 2013, pp. 1-20, U.S. Appl. No. 13/426,304, U.S. Patent and Trademark Office, Virginia.

(Continued)

*Primary Examiner* — Mary Cheung
*Assistant Examiner* — Frederick Brushaber
(74) *Attorney, Agent, or Firm* — Patterson & Sheridan, LLP

(57) ABSTRACT

A navigation system may display a segment of a digital map including a map element and a label corresponding to the map element. A portion of the digital map where no labeling shall occur may be determined based on coordinate values of the map element. The label may be displayed such that the portion of the digital map where no labeling shall occur is not occupied by any portion of the label.

21 Claims, 4 Drawing Sheets

(56) References Cited

U.S. PATENT DOCUMENTS

| | | | |
|---|---|---|---|
| 2004/0083108 A1 | 4/2004 | Tachimori et al. | |
| 2005/0052413 A1* | 3/2005 | Ueno | 345/158 |
| 2005/0182605 A1 | 8/2005 | Agrawala et al. | |
| 2006/0152503 A1 | 7/2006 | Lee et al. | 345/419 |
| 2007/0021911 A1 | 1/2007 | Kikuchi et al. | 701/211 |
| 2007/0192020 A1 | 8/2007 | Brulle-Drews et al. | 701/200 |
| 2007/0229513 A1 | 10/2007 | Bowman | 345/467 |
| 2008/0021644 A1 | 1/2008 | Meyer | 701/211 |
| 2008/0036787 A1 | 2/2008 | Gelber | |
| 2008/0198162 A1* | 8/2008 | Ni | 345/442 |
| 2008/0208450 A1 | 8/2008 | Katzer | 701/201 |
| 2008/0298162 A1 | 12/2008 | Passoni | 366/111 |
| 2010/0085350 A1 | 4/2010 | Mishra et al. | 345/419 |
| 2010/0280747 A1 | 11/2010 | Achthoven | 701/200 |
| 2012/0245841 A1* | 9/2012 | Spindler et al. | 701/428 |

FOREIGN PATENT DOCUMENTS

| | | | |
|---|---|---|---|
| EP | 0652418 A1 | 5/1995 | |
| EP | 0829823 A2 | 3/1998 | |
| EP | 0940795 A2 | 9/1999 | |
| EP | 1 024 467 A2 | 8/2000 | |
| EP | 1 189 176 A2 | 3/2002 | |
| EP | 1241445 A2 | 9/2002 | |
| EP | 1710713 A1 * | 10/2006 | |
| EP | 1 746 391 A1 | 1/2007 | |
| EP | 2273337 A2 | 1/2011 | |
| JP | 08194432 A | 7/1996 | |
| JP | H1089990 A | 4/1998 | |
| JP | 2000029450 A | 1/2000 | |
| JP | 2007085863 A | 4/2007 | |

OTHER PUBLICATIONS

European Search Report issued in European Patent Application No. 11002358.7, dated Sep. 20, 2011.
Office Action, dated Oct. 25, 2012, pp. 1-15, U.S. Appl. No. 13/426,304, U.S. Patent and Trademark Office, Virginia.
Office Action, dated Nov. 14, 2012, pp. 1-25, U.S. Appl. No. 13/426,360, U.S. Patent and Trademark Office, Virginia.
Examination Report for EP 11002356.1, dated Sep. 17, 2013.
European Office Action, EP 11 002 359.5, dated May 22, 2013, 3 pgs.
Office Action, dated Jul. 19, 2013, pp. 1-8, U.S. Appl. No. 13/426,376, U.S. Patent and Trademark Office, Virginia.
Office Action, dated Aug. 2, 2013, pp. 1-8, U.S. Appl. No. 13/426,304, U.S. Patent and Trademark Office, Virginia.

* cited by examiner

SYSTEM FOR DIGITAL MAP LABELING

BACKGROUND OF THE INVENTION

1. Priority Claim

This application claims the benefit of priority from European Patent Application No. 11 002 358.7, filed Mar. 22, 2011, which is incorporated by reference.

2. Technical Field

The present invention relates to digital maps representing towns and landscapes that can be used for route guidance by a navigation system and, in particular, it relates to the labeling of map elements such as roads and streets.

3. Related Art

The use of navigation systems, in particular, in vehicles such as automobiles has become increasingly prevalent. Usually, on board navigation computer systems analyze the combined data provided by a Global Positioning System (GPS), motion sensors such as antilock breaking system (ABS) wheel sensors, as well as a digital map to determine the actual position and velocity of a vehicle with increasing precision.

A navigation system typically may make use of electronic digital maps to represent cartographic features such as, for example, streets, buildings, and rivers. The navigation system may make use of a medium such as, for example, a compact disk or a digital video disc to store the data that relates to the cartographic features. After map matching, an actual position of a user may be indicated in the digital map. By acoustic and/or visualized information, the user may be guided to a predetermined destination.

SUMMARY

A navigation system may display a segment of a digital map including a map element and a label corresponding to the map element. A portion of the digital map where no labeling shall occur may be determined based on coordinate values of the map element. The label may be displayed such that the portion of the digital map where no labeling shall occur is not occupied by any portion of the label.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
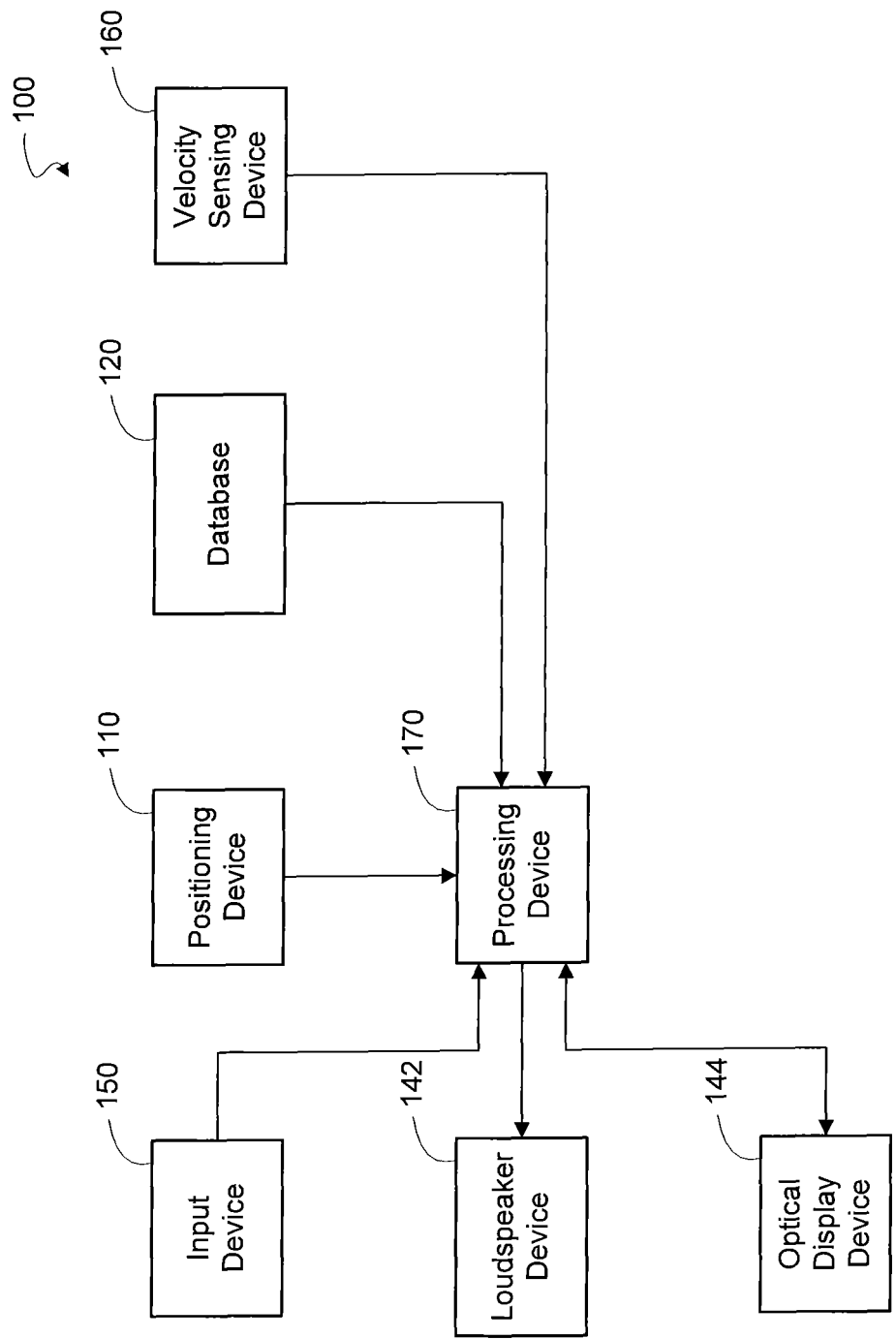
FIG. 1 illustrates one example of a navigation system.

In some examples, navigation systems may be able to display detailed digital maps indicating routes to destinations, the types of maneuvers to be taken at various locations such as, for example, junctions as well as different kinds of points of interest such as, for example, gas stations, restaurants, and landmarks. As the vehicle changes position, the vehicle position mark on the displayed image may change, or the digital map may be scrolled while the vehicle position mark remains fixed at a predetermined position.

In some examples, navigation systems may provide enlarged views, for example, of junctions on the guide route where the driver should turn to help the driver to identify the route to be taken to the predetermined destination more accurately. The displayed images may represent simplified synthesized views from the driver's perspective. In some examples, a 2-dimensional representation can confuse the driver, for example, if roads are intersecting at different height levels or in rotary turns with roads in close proximity. Throughout this disclosure, the terms "road" and "street" are used in an interchangeable manner.

In some examples, navigation systems may include algorithms for transforming data from a geographic database into a 3-dimensional perspective view, which may be more easily understood by drivers. Elaborate systems may allow for displaying an intersection approached by the vehicle at variable angles relative to the road depending on the complexity of the intersection. Herein, the terms "intersection" and "junction" are used in an interchangeable manner.

To provide navigation functions, the navigation system may include one or more detailed databases that include data which represent physical features of a geographic region. The employed navigation database may include a main image file including bitmap images including, for example, bitmap of the road geometry, signposts, landmarks, the sky-line, etc. The database may include a main image file including bitmap images and/or vector graphics including, for example, bitmap of the road geometry, signposts, landmarks, the skyline, etc.

In the digital maps, particular map elements such as rivers, mountains, roads, or particular areas, may be displayed supplemented by names (i.e., labels) of the respective map element. For example, a winding river may be labeled by the name of the river, or a mountain range may be displayed together with the name of the mountain range.

In some examples, in two-dimensional and/or three-dimensional digital map representations, labeling by characters representing the names of map elements may not be realized in satisfying manner with respect to an appropriate positioning. For example, parts of the map elements such as, for example, road junctions, may be at least partly hidden by labels annotated to the map elements, which may make identifying the map element more difficult. It may be beneficial to label map elements such that all parts, or at least a portion, of the labeled map element can reliably be identified by a user of a digital map including the map element.

The present disclosure provides a method for labeling a map element of a digital map, including determining a portion of the map element where no labeling shall occur and/or a portion in the vicinity of the map element in the digital map where no labeling shall occur; and labeling the map element with a label such that the portion of the map element where no labeling shall occur and/or the portion in the vicinity of the map element in the digital map where no labeling shall occur is not covered by the label.

FIG. 1 is a block diagram of an exemplary navigation system 100 configured for use in a vehicle, such as an automobile, a boat, an airplane, or any other passenger carrying conveyance. The navigation system 100 may include and/or be interfaced to various devices and/or systems. The navigation system 100 may include a positioning device 110 which may determine the position of the vehicle in which the navigation system 100 may be installed or operated. For example, the positioning device 110 may include a global positioning system (GPS) receiver or a comparable satellite positioning system receiver for receiving positioning signals from navigation satellites. In other examples, the positioning device may be any other form of mobile positioning system, such as a beacon system, an angle of arrival system, a time of arrival system, or any combination thereof. A digital map representation, as well as operating instructions and any other data or instructions related to the navigation system 100 may be stored in a database 120 and/or any other memory or memory device. The database 120 may include, for example, a map database configured to store digital map data, a geographic database configured to store geographic data, a navigation database configured to store navigation data, a vector graphics database configured to store vector graphics data (e.g., vector graphics for a landmark or other element), a label database configured to store label data, an animation database configured to store animated data, and/or a junction view database configured to store junction view data. The database 120 may include, for example, one or more of a hard disk device, a CD-ROM device, a DVD device, a ROM memory device, or any other one or more non-transitory data storage devices. In addition, rewritable non-volatile memory, such as flash memory, may be provided to store data and information in a flexible way and/or to maintain the stored information even in the case of a power outage.

The navigation system 100 may include a processing device 170 for performing operation aspects of the navigation system 100, such as providing navigation information (i.e., visual and/or audio output) to the vehicle user (e.g., the driver). The processing device 170 may be configured to include a general processor, a digital signal processor, application specific integrated circuit, field programmable gate array, analog circuit, digital circuit, server processor, combinations thereof, or other now known or later developed processor. The processing device 170 may be configured as a single device or combination of devices, such as associated with a network or distributed processing. Any of various processing strategies may be used, such as multi-processing, multi-tasking, parallel processing, remote processing, centralized processing or the like. The processing device 170 may be responsive to or operable to execute instructions stored as part of software, hardware, integrated circuits, firmware, micro-code, or the like.

The processing device 170 may receive position data from the positioning device 110 and geographic data from the database 120 to determine a current position of the navigation system 100 with respect to the digital map representation. The processing device 170 may generate navigation information on the basis of the current position and/or other received data such as, for example, a destination entered by an occupant of the vehicle. The navigation information may include map data of the area surrounding the current location of the vehicle. Additionally, or alternatively, the navigation information may include navigation instructions such as, for example, indications of which action should be taken to navigate the vehicle on a preselected navigation route (e.g., "turn left", "turn right", or "follow the course of the road").

The navigation system 100 may include various output devices to present or annunciate the navigation information to the driver. The output devices may include a loudspeaker device 142 and/or an optical display device 144. The loudspeaker device 142 may be a dedicated component of the navigation system 100. Alternatively, the loudspeaker device 142 may be a component of a vehicle entertainment system, such as a car radio, CD player, MP3 player, tape player, or a combination of such devices. If the navigation system 100 shares use of the loudspeaker device 142 with a vehicle entertainment system, the navigation system 100 may include an interface to permit transmission of the output signals corresponding to navigation information to the vehicle entertainment signal. This may be accomplished via a communication link such as a digital data bus in the vehicle. The optical display device 144 may be a full graphic display, such as, for example, a liquid-crystal display, a thin-film transistor display, or a cathode-ray tube display. The optical display device 144 also may be a projection display, such as a head-up display in which optical information may be projected onto a windscreen, or other surface of the vehicle. The optical display device 144 also may be combined with one or more input devices. For example, the optical display device 144 may be configured as a touchscreen device. The optical display device 144 may be a dedicated component of the navigation system 100 or may be used together with other vehicle systems, such as, for example, a multi-media system.

The processing device 170 may receive data from various other devices. The processing device 170 may be coupled to the positioning device 110 to receive a position data signal; to the database 120 to receive one or more of digital map data, geographic data, navigation data, vector graphics data, label data, animated data, and junction view data; to the loudspeaker device 142 to provide an acoustical output data signal; and/or to the optical display device 144 to provide an optical output data signal. The processing device 170 may evaluate position data received from the positioning device 110 via the position data signal and geographic data received from the database 120 to generate navigation information to be output to the vehicle user. The output navigation information may be a corresponding acoustical output signal and/or optical output signal.

Figure 2:
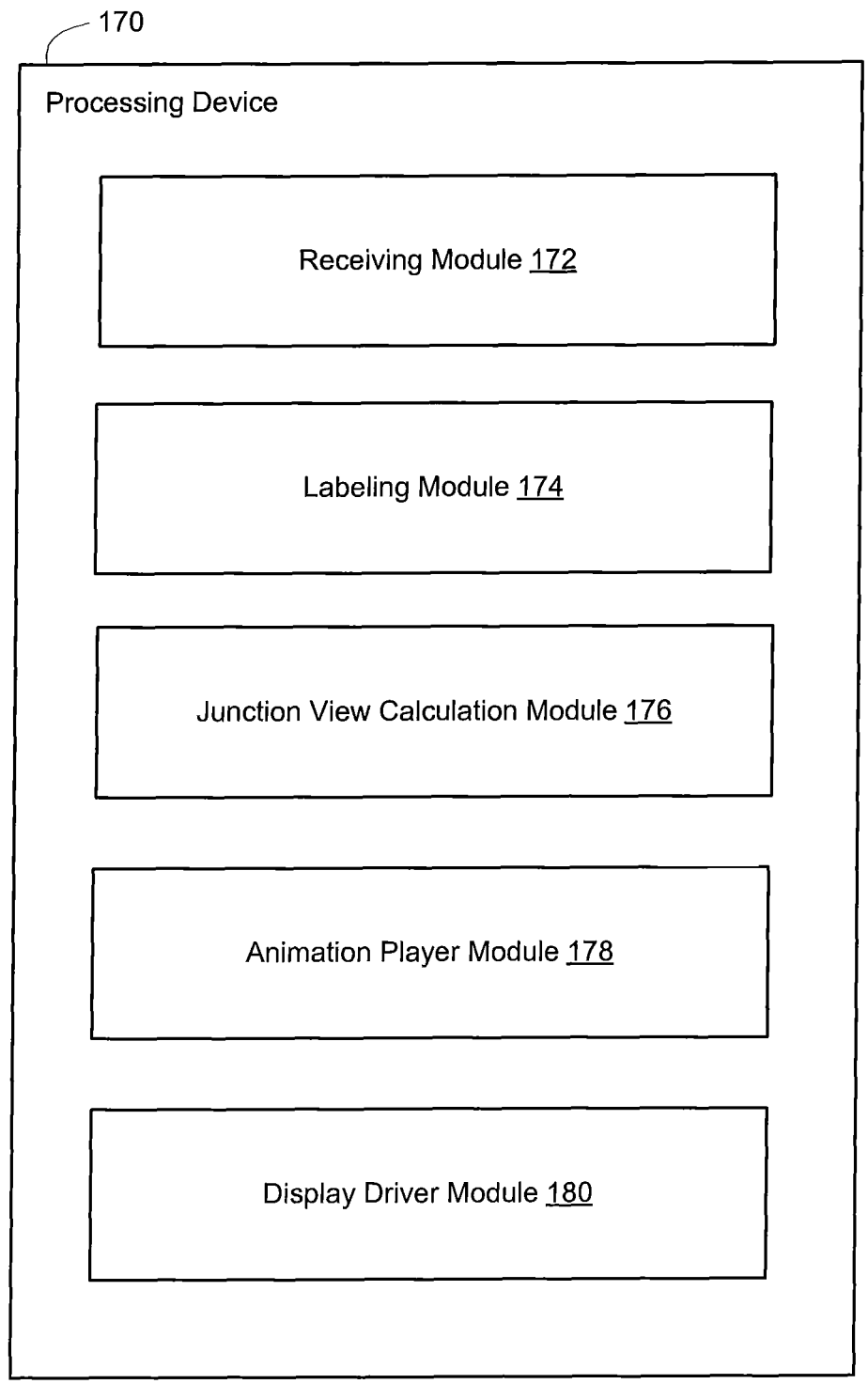
FIG. 2 illustrates one example of a processing device.

In one example, as shown in FIG. 2, the processing device 170 may execute a receiving module 172 configured to receive position data from the positioning device 110, geographic data from the database 120, and/or velocity data from the velocity sensing device 160. The processing device 170 may include a labeling module 174 configured to determine a label based on the received data and to determine a position on the digital map to place the label. The processing device 170 may include a junction view calculation module 176 configured to determine a junction view for display to the user. The processing device 170 may include an animation player module 178 configured to play an animation based on animated data (e.g., audio video interleave format (AVI) data). The processing device 170 may include a display driver module 180 configured to present an appropriate output based on the analysis as further described later. The term "module" may be defined to include one or more executable modules. As described herein, the modules are defined to include software, hardware or some combination thereof executable by a processing device (e.g., the processing device 170). Software modules may include instructions stored in the database 120, or any other memory device, that are executable by the processing device 170 or any other processor. Hardware modules may include various devices, components, circuits, gates, circuit boards, and the like that are executabl, directed, and/or controlled for performance by the processing device 170, or any other processor.

Additionally, or alternatively, the navigation system 100 may include an input device 150. The processing device 170 may be coupled to the input device 150 to provide the vehicle user with control over functions of the processing device 170. The input device 150 may include suitably designed switches, buttons, a microphone for voice commands, a keyboard, and/or any other mechanism or technique for inputting information to the navigation system 100.

The navigation system 100 may include and/or be interfaced to a velocity sensing device 160 to detect a current velocity of the vehicle. The velocity sensing device 160 may include motion sensors, such as Anti-Lock Braking System (ABS) wheel sensors. These sensors may be positioned in proximity to each individual wheel or within a differential of the vehicle. The processing device 170 may be coupled to the velocity sensing device 160 to receive a velocity data signal. Alternatively, or additionally, the processing device 170 may be configured to calculate the velocity of the vehicle using the position data received from the positioning device 110. The processing device 170 may calculate the velocity by analyzing the change in the position of the vehicle over a period of time.

A map element is a graphical element of the map that may represent a physical object such as, for example, a building, a road, a mountain, a river, a lake, etc. The label may denote a name of the map element such as, for example, the name of a river. Because a portion of the map element where no labeling shall occur and/or a portion in the vicinity of the map element in the digital map where no labeling shall occur may be determined, a label may be displayed in such a manner that the label does not fully or partly overlap and hide at least a portion of the map element. For example, a junction in two-dimensional or three-dimensional view can be displayed in a manner that allows for all relevant parts of the junction to be completely seen by a user. The label may be stored, for example, as label data in a database. In one example, the label data may be stored in a geographic database with or as a part of corresponding map element data. In other words, the map element data may include the label data for the map element. In other examples, the label data may be stored in a database separate from the corresponding map element data. The label data may include a size of the label. The size of the label may be used to ensure that there is no overlap between the label and at least a portion of the map element when the map element and the label are displayed together as further described later.

Figure 3:
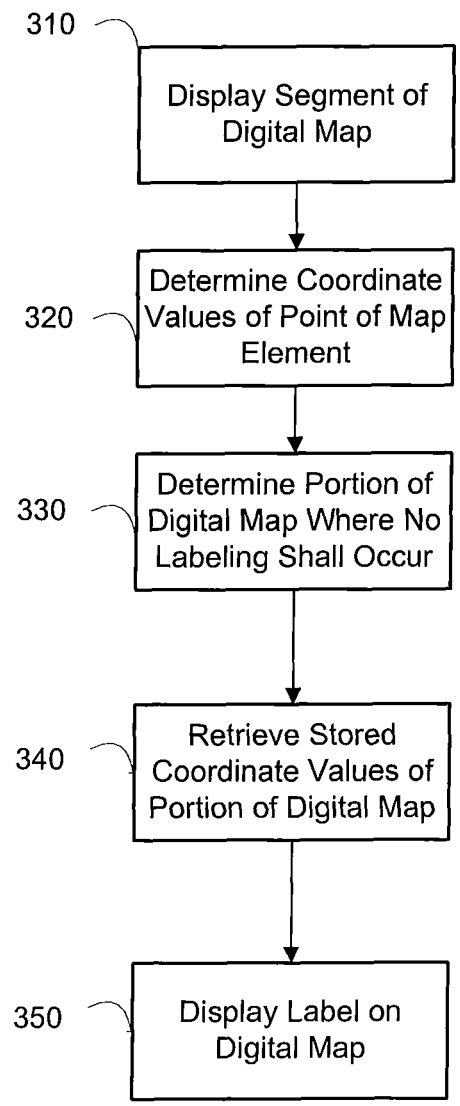
FIG. 3 illustrates one example of a method for displaying a label on a digital map.

The portion of the map element where no labeling shall occur and/or the portion in the vicinity of the map element in the digital map where no labeling shall occur can be determined based on coordinates provided for the digital map. In this manner, substantially exact positioning of the label may be possible. In one example, as shown in FIG. 3, the method for labeling a map element of a digital map may include displaying at least a segment of the digital map at step 310, and determining coordinate values of a point of the map element at step 320. The point of the map element may be any point forming a part of the map element. In one example, the point of the map element may be a central point positioned approximately at the center of the map element. In another example, the point of the map element may be a point positioned anywhere on the map element (e.g., a corner, an edge, or any other point). The point of the map element may correspond to a portion of the map element that may be recognizable by a user (e.g., an identifiable feature of a landmark) so that the recognizable portion of the map element may remain uncovered by the label as further described later. In one example, the point of the map element may include a plurality of points positioned along the map element. The portion of the map element where no labeling shall occur and/or the portion in the vicinity of the map element in the digital map where no labeling shall occur may be determined (e.g., by the labeling module 174) at step 330 based on the determined coordinate values of the point of the map element. The determined coordinate values of the point of the map element and/or the determined portion of the map element where no labeling shall occur and/or the determined portion in the vicinity of the map element in the digital map where no labeling shall occur may be stored in an employed database (e.g., the database 120).

In one example, the portion of the map element in the digital map where no labeling shall occur and/or the portion in the vicinity of the map element where no labeling shall occur may be determined by a distance relative to the coordinates with the determined coordinate values such as, for example, a radius defined about the coordinates with the determined coordinate values. For example, the radius may be defined about the coordinate of a central point of the map element. Information on the coordinate values of the coordinate of the central point and/or information on the coordinate values of the radius may be stored in the employed database. In one example, the method may include storing coordinate values of the portion of the map element where no labeling shall occur and/or the portion in the vicinity of the map element in the digital map where no labeling shall occur and retrieving these coordinate values at step 340 before labeling the map element with the label (i.e., displaying the label) at step 350 to reliably avoid hiding of portions of the map element.

Thus, calculation of the position of the label during the display process may be avoided. Instead, the calculation may be performed before the display process, and the result of the calculation may be stored in the form of the coordinate values of the portion of the map element where no labeling shall occur and/or the portion in the vicinity of the map element in the digital map where no labeling shall occur.

In one example, the method may include representing the map element by at least one spline including vertices; storing coordinate values corresponding to (i.e., derived from) coordinate values of at least one of the vertices of the at least one spline; and displaying the map element and displaying the assigned label in the digital map based on the stored coordinate values such that the label is adapted to the geometric form of the map element.

The map element may be represented (i.e. drawn) by means of one or more splines. The term "spline" denotes a function that is defined piecewise by polynomials. The correspondence of the coordinate values may be understood as follows. When m-1 vertices (i.e., knots) $t_i$, i=0, ..., m, are used for the representation of the map element, these vertices may be associated with coordinates $(x_i, y_i)$ in the digital map (or $(x_i, y_i, z_i)$ in the case of a three-dimensional digital map). The coordinates for positioning the label may be derived from the coordinates of vertices used for the splines. Accordingly, coordinates corresponding to (i.e., derived from) the vertices used for the spline representation of the map element can be used for the representation of the label (i.e., name) of the map element. For example, a number of the vertices can be chosen and coordinates $(x_i+d_x, y_i+d_y)$, shifted to some degree with respect to the coordinates of the vertices, with constants $d_x$ and $d_y$, can be stored for the generation of the label, for example, the generation of one or more splines by which the label can be generated. A label, which may include characters and/or symbols and/or icons (e.g., road number icons) following substantially the geometric shape (e.g., a curve) or the outer contour of the map element can be displayed in the digital map.

The combination of avoiding hiding of a map element by a label and labeling with labels following the shape (i.e., contour) of a map element may synergetically result in an increased readability of the labels and identification of the corresponding map element by the label.

In one example, a method for route guidance implemented in a navigation system such as, for example, a vehicle navigation system, with a display device may include the steps of the method according to one of the above-described examples and providing guidance information to a user of the navigation system.

In one example, a computer program product, may include one or more computer readable media having computer-executable instructions for performing the steps of the method according to one of the above-described examples. The computer program product may include any type of computer readable media, such as, for example, random access memory, flash memory, a hard drive, a CD-ROM device, a DVD device, a ROM memory device, or any other non-transitory data storage device. In addition, rewritable non-volatile memory, such as flash memory, may be provided to store processing information in a flexible way and to maintain the stored information even in the case of a power outage.

In one example, a navigation database may include a tangible computer readable medium including digital map data including data of a map element; map element data including coordinate values of a point of the map element and data of a label for the map element; and labeling data referring to the coordinate values indicating a portion of a digital map corresponding to the digital map data around the coordinates with the coordinate values where no labeling shall occur.

The data of the label may be linked to the coordinate values indicating a portion of a digital map corresponding to the digital map data around the coordinates with the coordinate values where no labeling shall occur such that the data of the label and the linked coordinate values can be retrieved (e.g., read) by a processing means (e.g., a processor) in order to display the label at an appropriate position in the digital map.

In one example, a navigation system such as, for example, a vehicle navigation system, may include the navigation database described above; and a display means configured to display a digital map based on data of the navigation database such that the map element of the digital map may be labeled by the label with characters without hiding the portion around the coordinates with the coordinate values where no labeling shall occur.

In any of the examples described throughout this disclosure, the digital map may be a two-dimensional map or a three-dimensional map. For example, the three-dimensional digital map may be generated based on a digital terrain model. A terrain model is a three-dimensional model (e.g., a digital model of a landscape obtained by laser-scanning). A variety of topographic terrain models may be available from official institutions and/or commercial providers. A digital terrain model may be a digital file including terrain elevations for ground positions at regularly or irregularly spaced horizontal intervals. The term "terrain" as used in this disclosure includes the three-dimensional topography of an urban area, a city, a village, etc. The raster points included in the terrain model may have three-dimensional coordinate values.

In any of the examples described throughout this disclosure, the label may be a two-dimensional label or a three-dimensional label. For example, the three-dimensional label may include three-dimensional representations of characters and the map element may be given by a bitmap or a vector graphic object and/or the label may be given by a vector graphic object.

In one example, a method for labeling a map element of a digital map used in a navigation system may include determining with the positioning device 110 the location of a vehicle in which the navigation system 100 is installed; displaying on the optical display device 144 the surrounding area of the determined location of the vehicle in the digital map with at least one item that represents a 3-dimensional object being displayed as a corresponding vector graphic in a 3-dimensional perspective view; determining with the processing device 170 a portion in the vicinity of the item that represents a 3-dimensional object being displayed as a corresponding vector graphic in a 3-dimensional perspective view where no labeling shall occur; and labeling with the labeling module 174 the item with a label such that the portion in the vicinity of the item in the digital map where no labeling shall occur is not covered (i.e., remains uncovered) by the label.

In one example, the method may include determining coordinate values of a point of the item. The portion in the vicinity of the item in the digital map where no labeling shall occur may be determined based on the determined coordinate values. The portion in the vicinity of the item where no labeling shall occur may be determined by a radius defined about the coordinates with the determined coordinate values.

In one example, a method of labeling an item that represents a 3-dimensional object being displayed as a corresponding vector graphic in a 3-dimensional perspective view may be implemented in a navigation system.

In one example, a navigation system such as, for example, a vehicle navigation system may include a navigation database including digital map data including data of an item that represents a 3-dimensional object being displayed as a corresponding vector graphic in a 3-dimensional perspective view; data including coordinate values of a point of the map element; data of a label for the item that represents a 3-dimensional object being displayed as a corresponding vector graphic in a 3-dimensional perspective view; and data referring to the coordinate values indicating a portion of a digital map corresponding to the digital map data around the coordinates with the coordinate values where no labeling shall occur. The navigation system may include a display means configured to display a digital map based on data of the navigation database such that the item that represents a 3-dimensional object being displayed as a corresponding vector graphic in a 3-dimensional perspective view may be labeled by the label with characters and/or symbols and/or icons without hiding the portion around the coordinates with the coordinate values where no labeling shall occur.

Figure 4:
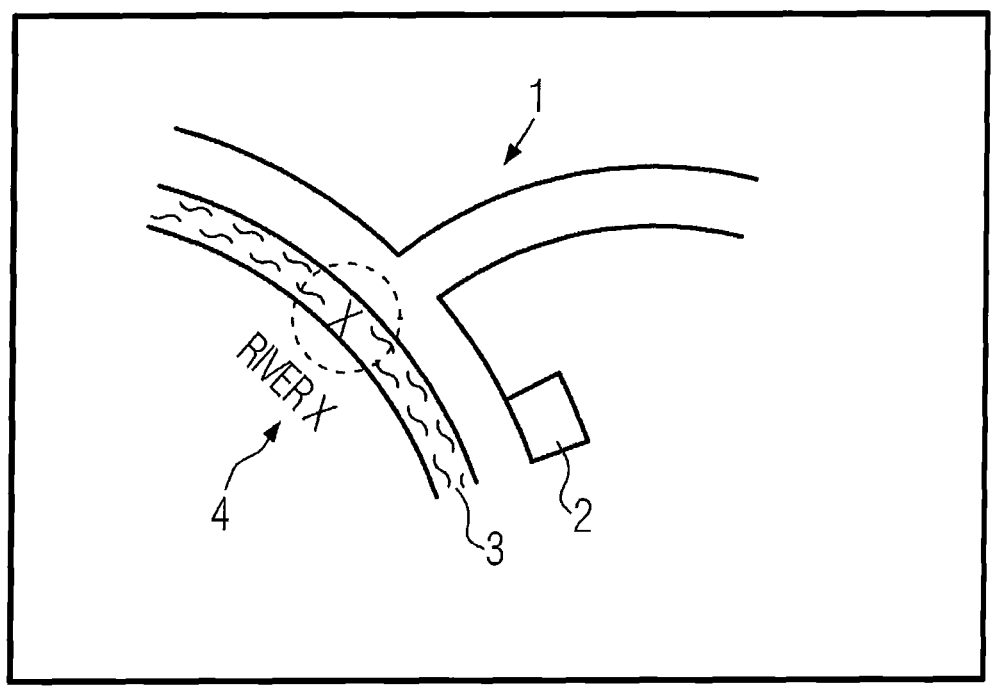
FIG. 4 illustrates a section of one example of a digital map including a label.

FIG. 4 illustrates a part of one example of a digital map showing some streets 1, a parking lot 2, and a river 3. The map element representing the river 3 may be generated by means of splines. The river 3 represents a map element that is labeled by the label "River X" 4 giving the name of the river. As it is shown in FIG. 4, the label may be positioned at an appropriate distance from the map element 3 such that no portion of the map element 3 is hidden by the label. In FIG. 4, a point of the map element 3 is indicated by an X. A region of the digital map including a portion of the map element 3 and in the vicinity of the map element 3 is shown by the dashed lines forming a circle around the point X. The region may indicate a region where it is not allowed to position the label 4. In other words, the region may indicate a portion of the digital map where no labeling shall occur. The coordinate values of the circle can be stored in the database 120 and retrieved by the processing device 170 in order to position the map element 3 after retrieving the map element 3 from the database 120.

In one example, splines may be used to show the river being a map element. A spline may be a sufficiently smooth piecewise-polynomial function. For example, cubic splines may be used for representing the map elements. Cubic splines may produce a curve that appears to be almost seamless. Cubic splines may be piecewise continuous, meaning that a sufficiently high derivative (e.g., third derivative) is discontinous. Accordingly, if the application is sensitive to the smoothness of derivatives higher than second, cubic splines may be less desirable. In other examples, any type of representation of map elements may be used.

The navigation system may be configured to display detailed 3-dimensional junction views. For example, video data may be obtained from a junction and stored to a database such as, for example, an offline-database. The database may include a main image file including bitmap images for all lanes, sign post information, landmarks, etc. The navigation system may model the junction view on the basis of the afore-mentioned database by means of standard bitmap images. These bitmap images may include a bitmap of the road geometry, for example, three lanes with an exit for one of these lanes, a bitmap of the recommended lane, bitmaps for signposts, landmarks, the skyline, and the color of the sky.

In one example, the calculation of the junction view may be performed by simplified and/or non-typical elements (i.e., standard bitmaps). In another example, the junction view may include one or more individually designed elements such as, for example, landmarks provided in the form of vector graphics including details that may be helpful for identifying a landmark. The labels may be provided a part of such three-dimensional junction views.

In one example, the navigation system may be configured to display the surrounding area of a determined location of the vehicle in a digital map with at least one item that represents a 3-dimensional object being displayed as a corresponding vector graphic in a 3-dimensional perspective view. Individual objects can be scanned by means of survey systems such as, for example, laser scanners, and digitized representations of the objects may be obtained. Based on the recorded pictures of buildings, or the like, 3-dimensional models may be synthesized as vector graphics. The displaying of individual objects in a 3-dimensional perspective view may improve the driver's orientation and help the driver to effectively and/or positively choose the correct road at a junction (i.e. the road to be taken to the predetermined destination).

The employment of vector graphics may improve the representation of individual objects. Bitmapped images may include rows and columns of dots, while vector graphics may be represented as mathematical formulas that define the shapes in an image. Vector graphics, being based on mathematical functions, may be scalable, not restricted to rectangular shapes, and/or transparent. Additionally, or alternatively, vector graphics may require less disk space than bitmaps, since vector graphics can be calculated from relatively fewer stored data points. Thus, vector graphics can relatively easily be used for calculating and displaying 3-dimensional perspective views of synthesized individual objects.

In one example, displayed 3-dimensional perspective views of synthesized individual objects can be labeled by a label positioned such that the label does not hide the synthesized object or such that the label only hides a part of the synthesized object without affecting the recognition of the object by a driver. In other words, the label may be positioned such that at least a portion of the synthesized object remains unobstructed by the label so that the object remains recognizable by the driver. Given the actual position of the vehicle and the driving direction as recommended by the navigation system, a geographical section can be calculated for which it may be desirable to display 3-dimensional perspective views of landmarks or other objects represented by vector graphics. Such landmarks or other objects may be useful for orientation of the driver. In one example, the geographical section of interest may be calculated as a segment of a circle given by an angle of about 90° and a radius of about 10 km, approximately corresponding to the human visual angle at the horizon. In other examples, depending on the road geometry and, in particular, the slope of the road, different ways of calculation of the geographical section of interest may be preferred.

It should be noted that at least one item displayed in a 3-dimensional perspective view can be a landmark. In other words, landmarks are one kind of item that may be synthetically represented by vector graphics of the vector graphics database. Since landmarks such as, for example, towns' landmarks may exhibit a high memory value, landmarks may be particularly suitable to help to orient the driver when faced with a complex road topology. In one example, such a landmark can be labeled by a label positioned such that the label does not hide the synthesized landmark. In other words, the label may be positioned such that at least a portion of the synthesized landmark remains unobstructed by the label so that the landmark remains recognizable to help to orient the driver.

In one example, navigation, including the display of a 3-dimensional perspective view of an object labeled by a label may be performed as follows. Map matching may enable precise location of the vehicle in the digital map provided by a map database (e.g., the database 120). The position in the map may be displayed to the driver (e.g., on the display device 144). Based on the information about the actual position of the vehicle and the driving direction according to the recommended route, the geographical section in view of the driver can be calculated (e.g., by the processing device 170). By means of the map matching and the map database, it can be determined whether a landmark comes into view in the forward path of the vehicle according to the predetermined route.

If a landmark is detected and some reference in the map database indicates that a vector graphic is available, the respective 3-dimensional vector graphics may be looked up (e.g., by the processing device 170) in the vector graphics database (e.g., the database 120). Alternatively, the system can address the vector graphics database independent from any reference information available from the map database.

For the appropriate 3-dimensional vector graphics, the respective perspective view of the synthesized landmark may be calculated. By means of a display controller (e.g., the display driver module 180), the processed vector graphic can be concurrently displayed with the usual bitmap representation. The landmark represented by a standard bitmap in the map database may be replaced or superposed by the respective vector graphics. Eventually, a mixed bitmap and vector graphics view may be displayed to the user (e.g., the driver). One or more of the items/objects displayed to the user may be labeled as described in this disclosure. The label can, for example, be positioned at an appropriate distance to the displayed 3-dimensional vector graphics such that no portion of the 3-dimensional vector graphics is hidden by the label.

In some examples, a portion of the map element or 3-dimensional perspective view of an object in the digital map where no labeling shall occur and/or the portion in the vicinity of the map element or the 3-dimensional perspective view of an object where no labeling shall occur can be determined (e.g., by the processing device 170) by a distance or radius defined about coordinates of the map element or object with defined coordinate values.

In one example, the portion of the map element or 3-dimensional perspective view of an object in the digital map where no labeling shall occur and/or the portion in the vicinity of the map element or the 3-dimensional perspective view of an object where no labeling shall occur can be provided in the geometrical shape of a circle with the above-mentioned radius. In other examples, any other geometrical shape considered appropriate might be chosen. The shape may be defined by the distance from the defined coordinate values of the point (or multiple points) of the map element as described above. For example, some ellipsoidal form defined by a major and a minor axis or a rectangular shape might be chosen; a convex envelope or hull might be chosen; or a Euclidean or Minkowski distances might be used for defining an area where no label shall be positioned.

In any of the examples described throughout this disclosure, the digital map may be configured as any kind of digital map. For example, the digital map may be used in a navigation system for pedestrians or a vehicle navigation system such as, for example, a navigation system installed in an aircraft, boat, automobile, or any other passenger carrying conveyance.

In some examples, the labels may include characters, icons, and/or symbols of any kind considered suitable for the labeling. In one example, the labels may be stored in a label database. In other examples, the labels may be stored in another database (e.g., the map database, the navigation database, the vector graphics database, or any other database). In one example, the digital map may be configured as a digital map used for navigation purposes, and the labels may be configured as signposts (i.e. posts giving information for guidance). Signposts may include relatively big signs displaying, for example, the direction to a city, signpost icons in the form of a graphic representation of facilities such as an industrial area, a soccer stadium, an airport, etc., road number icons indicating the number of a road, a highway, etc., and/or an exit number icon indicating the road number of a road branching at an intersection (i.e., junction). In the physical environment, signposts can be found at junctions such as, for example, junctions on highways. In some examples, the labels referred to in this disclosure may be provided in the form of such signposts. The signposts may be displayed such that that the signposts are not hiding one or more map elements that may be important for navigation purposes. In other words, the signpost may be displayed such that the map element remains fully or partially unobstructed by the signpost.

In some examples, a user may select that labels are not displayed but rather hidden. Thus, selectively, based on an actual user's desire, all or a portion of the labels displayed in a digital map may be hidden in response to an input by the user. In one example, the navigation system may receive the input from the user by way of the input device 150.

In any of the examples described throughout this disclosure, the navigation system may be configured to display detailed three-dimensional animated junction views. In one example, when a vehicle in which the navigation system is installed approaches a junction, a representation of the respective junction may be provided by a junction view database. In one example, the junction view database may include references to an animation database storing animated data.

The animated data may include data units that may include bitmaps, vector graphics, and/or metafiles (i.e., combined bitmaps and vector graphics). The animation data may include a temporal sequence of individual static images. The speed at which the animation takes place may depend on the location and/or speed of the vehicle. The animation data may show perspective views of the approached junction (e.g., the number of lanes, slopes, branches, crossroads, etc.). Additionally, or alternatively, the animation data may include topographical objects such as, for example, bridges and administrative buildings, and/or signposts, and/or environmental views representing, for example, an urban, rural or industrial environment, or a mountain landscape.

A junction view calculation module of the navigation system may address the animation database to obtain the relevant animated junction view data. Alternatively, the junction view calculation module may produce animated data from standard images provided by an animation database, a junction view database, and/or a map database.

In one example, the animated data can be available in the Audio Video Interleave (AVI) format. The AVI data may be provided to an AVI player of the navigation system. The animation may start and/or end at well-defined positions ahead of and behind the junction. It may be desirable for the AVI player to be synchronized with data provided by a location system determining accurately the actual position of the vehicle. Thereby, the elapsed time may be synchronized with the driven distance, and the synthesized animated junction view may be displayed on the display device of the navigation system synchronously to the actual position of the vehicle. The labels referred to throughout the present disclosure may readily be included in such an animated junction view without hiding relevant parts of the elements of the animated junction view.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A method for displaying a label on a digital map, the label corresponding to a map element of the digital map, the method comprising:
    displaying on a display device at least a segment of the digital map;
    determining a boundary of a region of the digital map where no labeling shall occur based on first coordinate values of a point of the map element, the region of the digital map where no labeling shall occur comprising at least a portion of the map element, where the region of the digital map where no labeling shall occur is determined by a distance defined relative to the first coordinate values of the point of the map element;
    retrieving from a database stored second coordinate values defining the boundary of the region of the digital map where no labeling shall occur; and
    based on the retrieved stored second coordinate values, displaying on the display device the label on the digital map such that the region of the digital map where no labeling shall occur is not occupied by any part of the label.

2. The method of claim 1, where the digital map is a three-dimensional map.

3. The method of claim 1, where the label is a three-dimensional label comprising a three-dimensional representation of a character.

4. The method of claim 1, wherein determining the region of the digital map comprises using one or more distances relative to the first coordinate values to identify the boundary around the first coordinate values that defines the region of the digital map where no labeling shall occur.

5. The method of claim 1, where the label is given by a vector graphic object.

6. The method of claim 1, further comprising;
representing the map element by at least one spline comprising a plurality of vertices, where third coordinate values derived from coordinate values of at least one of the plurality of vertices of the at least one spline are stored in the database;
displaying on the display device the map element; and
displaying on the display device the label in the digital map based on the stored third coordinate values such that the label is adapted to a geometric form of the map element.

7. The method of claim 1, where displaying at least a segment of the digital map comprises displaying the segment of the digital map on the display device of a vehicle navigation system, displaying the label comprises displaying the label on the display device of the vehicle navigation system, and the method further comprises providing guidance information to a user of the navigation system.

8. The method of claim 1, where the map element comprises a junction, and displaying at least a segment of the digital map comprises displaying a three-dimensional animated junction view of the junction.

9. The method of claim 1, where the map element comprises a landmark, the region of the digital map where no labeling shall occur comprises at least a portion of the landmark, and the portion of the landmark remains unobstructed by the label for orientation of a user of the digital map.

10. The method of claim 1, where the label is displayed such that a second portion of the map element positioned outside of the region of the digital map where no labeling shall occur is occupied by at least a part of the label.

11. A non-transitory computer readable medium comprising a plurality of instructions executable by a processor, the tangible computer readable medium comprising:
instructions executable to display a segment of a digital map, the segment of the digital map comprising a map element;
instructions executable to determine a boundary of a region of the digital map where no labeling shall occur based on first coordinate values of a point of the map element and a distance relative to the first coordinate values of the point of the map element;
instructions executable to retrieve stored second coordinate values defining the boundary of the region of the digital map where no labeling shall occur; and
instructions executable to display the label on the digital map based on the retrieved stored second coordinate values, where the label is displayed such that the region of the digital map where no labeling shall occur is not occupied by any portion of the label.

12. The non-transitory computer readable medium of claim 11, where the digital map is a three dimensional map.

13. The non-transitory computer readable medium of claim 11, where the label is a three-dimensional label comprising a three-dimensional representation of a character.

14. A method for labeling a map element of a digital map of a navigation system for use in a vehicle, the method comprising:
determining a location of the vehicle in which the navigation system is installed;
displaying on a display device a segment of the digital map comprising a surrounding area of the determined location of the vehicle, the segment of the digital map comprising an item that represents a 3-dimensional object being displayed as a corresponding vector graphic in a 3-dimensional perspective view;
determining a boundary of a region of the digital map where no labeling shall occur by retrieving from a database stored coordinate values of the boundary of the region of the digital map where no labeling shall occur, wherein at least part of the item is within the region of the digital map; and
labeling the item with a label such that the region of the digital map is not occupied by any portion of the label.

15. The method of claim 14, further comprising determining coordinate values of a point of the item, and where the region of the digital map where no labeling shall occur is determined based on the determined coordinate values of the point of the item.

16. The method of claim 15, where the region of the digital map where no labeling shall occur is determined by a radius defined about the determined coordinate values of the point of the item, the radius defining the boundary of the region of the digital map.

17. The method of claim 14, where retrieving the stored coordinate values is performed before labeling the item with the label.

18. The method of claim 14, further comprising providing guidance information to a user of the navigation system.

19. A navigation database comprising data stored on a tangible computer readable medium, the data comprising:
digital map data comprising data of a map element that represents a 3-dimensional object to be displayed as a corresponding vector graphic in a 3-dimensional perspective view;
map element data comprising coordinate values of a point of the map element and a label for the map element; and
label data comprising data indicating a boundary of a region of a digital map where no labeling shall occur, the digital map corresponding to the digital map data, and the region of the digital map defined based on the coordinate values of the point of the map element.

20. The navigation database of claim 19, where the label data comprises coordinate values of the region of the digital map where no labeling shall occur.

21. A navigation system for use in a vehicle, the navigation system comprising:
a navigation database comprising:
digital map data comprising data of a map element that represents a 3-dimensional object to be displayed as a corresponding vector graphic in a 3-dimensional perspective view,
map element data comprising coordinate values of a point of the map element and a label for the map element, and
label data comprising data indicating a boundary of a region of a digital map where no labeling shall occur, the digital map corresponding to the digital map data, and the region of the digital map defined based on the coordinate values of the point of the map element; and
a display configured to display the digital map based on data of the navigation database such that the map element is labeled by the label with at least one of characters, symbols, and icons without covering the region of the digital map where no labeling shall occur.

* * * * *